Aug. 5, 1969 G. D. PETERSON ET AL 3,459,527
CENTRIFUGAL FORMING MOLD
Filed July 26, 1965 4 Sheets-Sheet 1
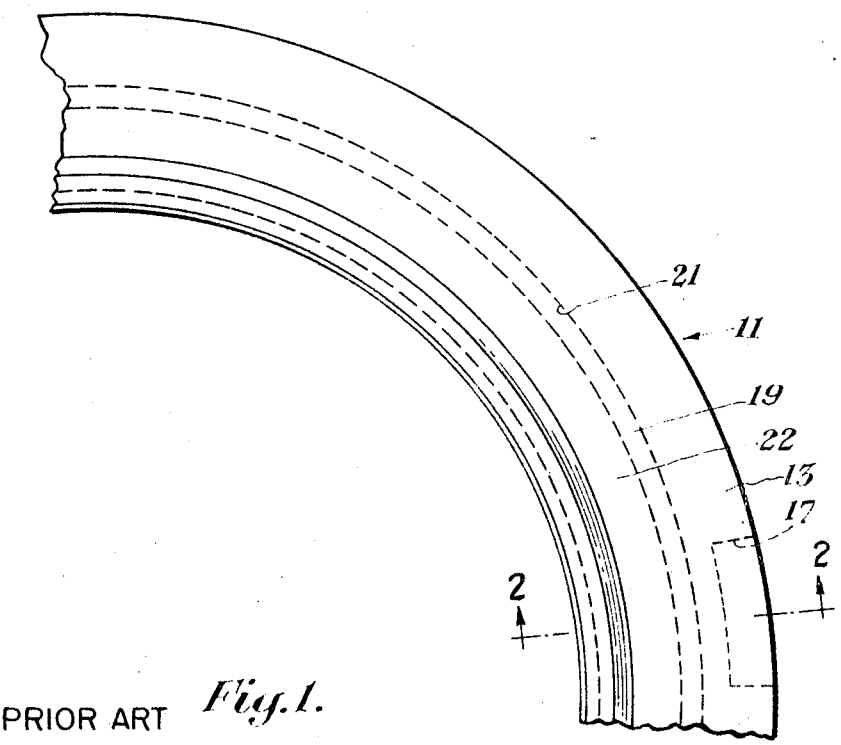
PRIOR ART *Fig.1.*
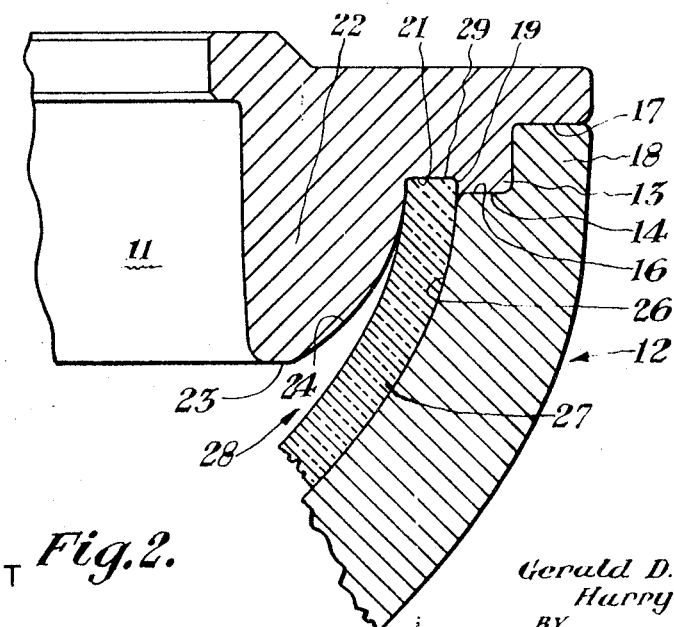
PRIOR ART *Fig.2.*
INVENTORS
*Gerald D. Peterson and
Harry J. Schaffer.*
BY
*Charles W. Gregg*
AGENT Aug. 5, 1969  G. D. PETERSON ET AL  3,459,527
CENTRIFUGAL FORMING MOLD Filed July 26, 1965  4 Sheets-Sheet 3

INVENTORS
Gerald D. Peterson and
Harry J. Schaffer.
BY Charles W. Gregg
AGENT

Aug. 5, 1969  G. D. PETERSON ET AL  3,459,527
CENTRIFUGAL FORMING MOLD

Filed July 26, 1965  4 Sheets-Sheet 4

INVENTORS
Gerald D. Peterson and
Harry J. Schaffer
BY
Charles W. Gregg
AGENT

United States Patent Office 3,459,527
Patented Aug. 5, 1969

3,459,527
CENTRIFUGAL FORMING MOLD
Gerald D. Peterson, Addison, and Harry J. Schaffer, Horseheads, N.Y., assignors to Corning Glass Works, Corning, N.Y., a corporation of New York
Filed July 26, 1965, Ser. No. 474,738
Int. Cl. C03b 19/04
U.S. Cl. 65—302                                        6 Claims

ABSTRACT OF THE DISCLOSURE

A ring mold for use in conjunction with a generally rectangular funnel-shaped centrifugal forming mold being constructed with channels or air chambers extending along the lengths of the ring mold which lie above the lengths of the sidewalls of said forming mold that are generally parallel with the major axis of the opening of the forming mold to provide thermal insulation to selectively cool and prevent crizzle on the sealing surfaces of the funnel members.

---

The present invention relates to centrifugal forming. More specifically the present invention relates to the centrifugal forming of funnel members or parts to be used in the making of cathode-ray tube envelopes. Still more particularly, this invention relates to a novel type of ring mold employed in conjunction with a funnel mold for forming, by centrifugal force, glass funnel parts or members to be used in the fabrication of color or polychromatic television picture tube envelopes having a generally rectangular frusto-pyramidical configuration.

The centrifugal forming or spinning of glass funnel members or parts to be sealed to complementally-mating glass viewing panel parts or members to make so-called monochromatic cathode ray or television picture tube envelopes is now old and well known in the art. In such fabrication of monochromatic tube envelopes from the complementally-mating glass, such members are directly fusion sealed to each other to make the television tube envelopes. However, in the relatively recent development of color or polychromatic television picture tubes, it was found that direct fusion sealing of the mating viewing panel and funnel members was impractical due to the possibility of the excess heat used in fusion sealing causing harm to certain elements employed in such polychromatic tubes. Furthermore, in the fabrication of color television picture tube envelopes, it was found extremely difficult to fusion seal the viewing panel and funnel members to each other while maintaining the extremely critical alignment that is required between such members in the completed tube envelope. These problems are now well known to those skilled in the art.

In view of the above problems, thermal sealing compositions or solder glass frits having relatively low melting temperatures were developed and are employed for sealing polychromatic viewing panel and funnel members to each other, a coating of such materials being applied to the mating annular sealing surfaces of such members for such purpose. However, in such use of the sealing compositions or thermal sealing glass frits, it was found necessary or expedient to provide on said funnel members wider sealing surfaces or edges than those previously employed on funnel members used in the fabrication of monochromatic picture tube envelopes. Such wide edge funnel members for round polychromatic television picture tube envelopes can be formed by methods similar to that employed for producing funnel members for round monochromatic television picture tube envelopes, one such method being shown and described, for example, in Letters Patent of the United States 2,629,206, issued Feb. 24, 1953 to James W. Giffen et al. for Glass Severing. In forming the wide sealing edge funnel members by a method such as that disclosed in such patent, a quantity of glass substantially greater than that employed in the centrifugal forming of funnel members for monochromatic television tube envelopes is supplied to the forming mold. As is readily apparent, such greater quantity of glass, upon the centrifugal forming thereof into a picture tube funnel member, results in a funnel member having a substantially thicker annular wall than when a lesser amount of glass, such as that normally used in forming a funnel member for a monochromatic picture tube envelope, is spun in a centrifugal forming mold. The glass of the thick wall funnel member so formed may be severed in the manner such as described in said Giffen patent, thereby resulting in a funnel member having a wide sealing surface or seal edge.

In employing the method described in said Giffen et al. patent for the severance of the glass of a funnel member for a television picture tube envelope, a relatively rough or ragged severance line or edge results. Such a ragged or rough edge requires a considerable amount of grinding and polishing to convert such edge into a sealing edge sufficiently smooth for sealing the funnel member to the complementally mating sealing edge of a viewing panel member in the fabrication of a television picture tube envelope. As is apparent, said grinding and polishing for the purpose of providing a smooth sealing edge is a time consuming and, therefore, a relatively expensive step. This was found to be especially true when funnel members for polychromatic television picture tube envelopes were produced by the method disclosed in the cited Giffen et al. patent, since such members had substantially thicker annular walls and, therefore, required more time for the step of grinding and polishing of the severance edge to provide the smooth seal surface or edge necessary for said sealing operation.

In view of the information set forth in the foregoing discussion, a method of producing funnel members for round polychromatic television picture tube envelopes and inherently having relatively smooth sealing surfaces or edges and, therefore, requiring no or a minimum of grinding and polishing thereof, was found. Broadly, such method comprises using a ring mold which complementally mates with the large open end of a main funnel mold, and centrifugally forming or spinning a quantity of glass in said main funnel mold until the glass contacts a preselected relatively wide flat smooth surface of the ring mold and conforms to such surface to provide a relatively smooth sealing surface or edge on the funnel member formed in the main mold. Such sealing surface or edge so formed on a funnel member requires no or a very minimum amount of grinding and polishing to provide a surface for optimum sealing thereof to the mating sealing edge or surface of a viewing panel member in the fabrication of a television picture tube envelope. Such a method is disclosed, for example, in British Patent 822,-627, published Oct. 28, 1959.

The above described method of providing wide and smooth sealing surfaces or edges on centrifugally formed funnel members for round polychromatic picture tube envelopes performs very satisfactorily since such members, and therefore, their forming mold or molds, are radially symmetric, at least in the region of the sealing surfaces or edges thereof. However, in attempting to employ a similar centrifugal forming method for the production of funnel members for rectangular television picture tube envelopes, it was found that crizzle often developed on the sealing edges or surfaces adjacent the relatively straight sidewalls and especially the longer ones of such sidewalls of the rectangular funnel members formed by such method. That is to say, such sealing edges or surfaces often had a multitude of fine surface fractures, cracks or checks, thereby resulting in a large and intolerable percentage of rejections of the funnel members. It is believed that the present invention will be more readily understood from the following brief preliminary discussion of the factors determined to be the cause of such crizzle.

In the spinning of a funnel member for a rectangular television picture tube envelope, the molten glass supplied to the centrifugal forming mold and spun therein so as to fill the mold, in addition to moving vertically, also moves horizontally along the relatively straight or only slightly curved sidewall areas of the mold and collects or piles up in the corner areas of the mold. Therefore, when a ring mold similar to that hereinbefore described for the centrifugal forming of funnel members for round television picture tubes is employed in conjunction with a rectangular centrifugal forming mold, the molten glass moving up the walls of the main forming mold and contacting the ring mold in the regions of the relatively straight sidewalls of the ring mold has less volume per unit area than does the molten glass contacting the ring mold in the corner regions of the main and ring molds. This causes variations between said regions in the rate of removal of heat from the molten glass per unit area of glass. That is to say, the glass is cooled by contact with the ring mold more rapidly in the regions of the relatively straight sidewalls of the molds than in the corner regions thereof. Regardless of the collection or pileup of the glass in the corner regions of the mold due to the spinning thereof, it is believed readily apparent that there is also more surface of a ring mold contacted by the glass along the relatively straight sidewalls of the mold than is contacted by the glass around the corner regions of the mold. This factor also contributes to the differential cooling of the glass in said regions of the main and ring molds. The excessively rapid cooling of the formed glass contacting the ring mold in the regions of the straight sidewalls thereof was determined to be the cause of the crizzle or the minute fractures which developed on the seal edges or sealing surfaces of the funnel members formed by the use of ring molds of a type similar to that employed for centrifugally forming funnel members for round television picture tube envelopes.

It is accordingly, in view of the foregoing discussion, an object of the present invention to provide a new type of ring mold for use in conjunction with a main funnel mold for centrifugally forming wide seal edge or sealing surface glass funnel members for rectangular polychromatic or color television picture tube envelopes, such ring mold preventing or eliminating the development of the crizzle or minute fractures which occurred on the sealing edges of such members when ring molds of previous types were employed with funnel molds for forming rectangular picture tube funnel members.

It is another object of the invention to provide a novel type of ring mold to be employed with a main funnel mold in making a rectangular funnel member or part to be used in the fabrication of polychromatic television picture tube envelopes having a generally rectangular frusto-pyramidical configuration.

A third object of the invention is the provision of a ring mold adapted for use with a funnel mold for the centrifugal forming or spinning of rectangular funnel parts or members for television picture tube envelopes and having a wider sealing surface or seal edge than heretofore provided in the regions adjacent the centres of the longer sidewalls of such members by a centrifugal forming process.

In accomplishing the above objects of the invention there is provided a ring mold for use in conjunction with a generally funnel-shaped centrifugal forming mold including a mold cavity having an inverted generally rectangular frusto-pyramidical configuration for the forming of molten glass into funnel members for television picture tube envelopes having a configuration corresponding to such cavity, such ring mold being constructed so as to provide selective cooling of the sealing surfaces formed on said funnel members when said glass contacts an annular area of the ring mold, such selective cooling of the sealing surfaces preventing the development of crizzle on such surfaces.

Other objects and characteristic features of the invention will become apparent as the description proceeds.

It is believed expedient to point out at the outset of this description that the terms "minor axis" and "major axis" where used herein refer to imaginary lines extending between the centers of the longer sidewalls and shorter sidewalls, respectively, defining the annular top opening leading into the mold cavity of the funnel mold described, or the corresponding portions of a funnel part formed therein; while the term "diagonal axes" refers to imaginary diagonal lines extending between the centers of the corner regions of such mold opening or of such a funnel part.

The invention will best be understood with reference to the accompanying drawings wherein:

FIG. 1 is a top plan view of approximately a quarter or 90° arcuate section of a mold ring used in conjunction with a round or circular funnel mold for centrifugally forming a glass funnel part in accordance with previous practice;

FIG. 2 is a cross-sectional view on an enlarged scale of a section of the ring mold of FIG. 1, taken generally along line 2—2 of FIG. 1, and including cross-sections of fragments of a circular glass funnel mold and a funnel part or member formed in such mold;

Figure 3:
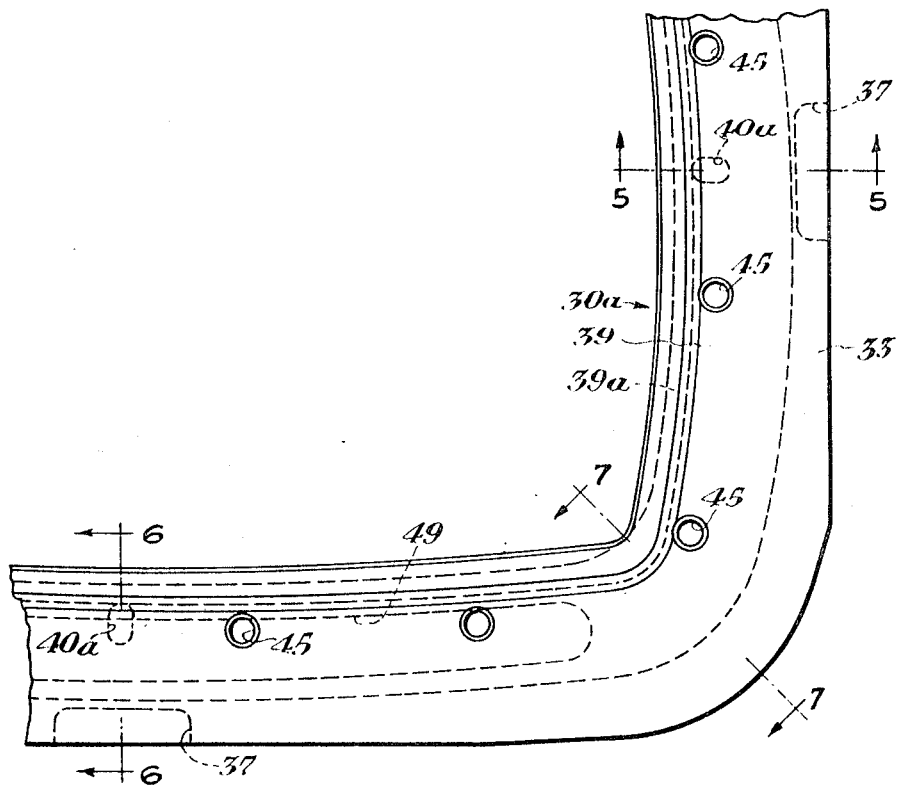
FIG. 3 is a top plan view of approximately a quarter or 90° arcuate section of the upper part of a two-piece bisymmetrical ring mold in accordance with the present invention.
Figure 4:
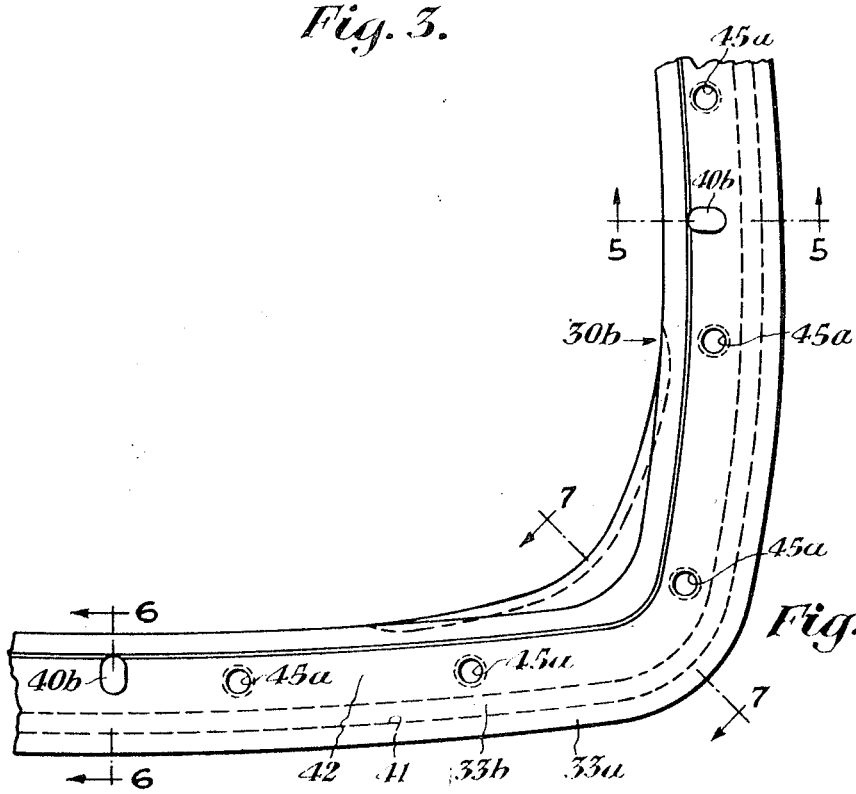
FIG. 4 is a top plan view of approximately a quarter or 90° arcuate section of the lower part of the two-piece bisymmetrical ring mold in accordance with the invention.
Figure 5:
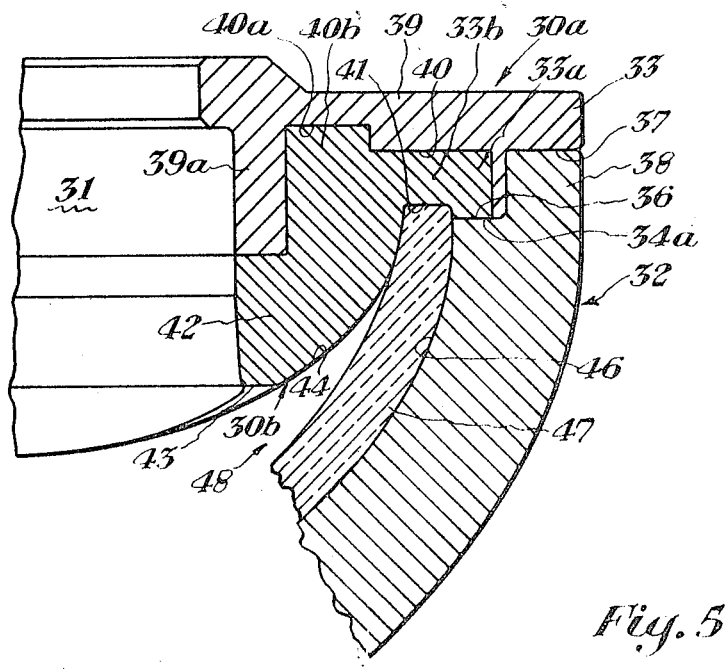
Figure 6:
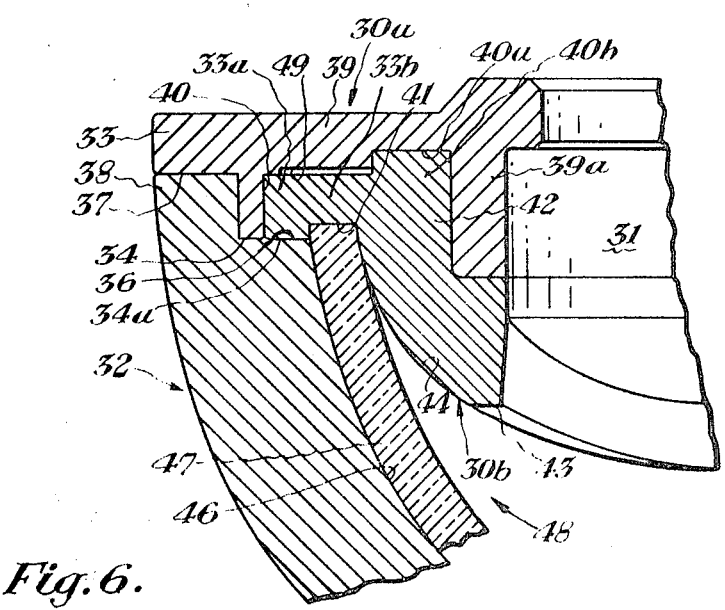
Figure 7:
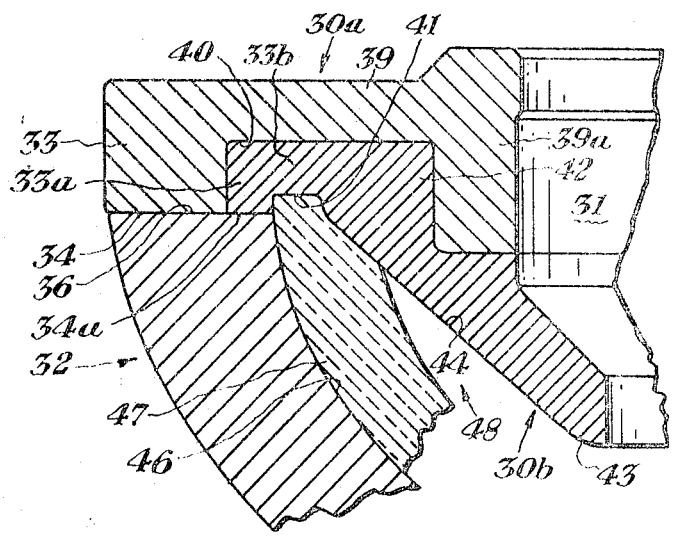

FIG. 5 is a cross-sectional view on an enlarged scale of the two-piece ring mold of FIGS. 3 and 4 with the two parts of such mold disposed in cooperative relationship with each other, and including cross-sections of fragments of a bisymmetrical or rectangular glass funnel mold and of a funnel part or member formed in such mold, such cross-sectional view taken generally along the lines 5—5 of FIGS. 3 and 4;

FIG. 6 is a cross-sectional view similar to FIG. 5 and also on an enlarged scale, and taken generally along the lines 6—6 of FIGS. 3 and 4; and FIG. 7 is a cross-sectional view similar to FIG. 5 and also on an enlarged scale, and taken generally along the lines 7—7 of FIGS. 3 and 4.

Similar reference characters refer to similar parts in each of the figures of the drawings.

Referring first to FIGS. 1 and 2 of the drawings there is illustrated approximately a quarter section of a circular ring mold 11 heretofore used in conjunction with a main funnel mold 12 having a round or circular top opening, such parts being complementally disposed (FIG. 2) for centrifugal forming of wide seal edge or sealing surface funnel parts for round television picture tube envelopes. Main funnel mold 12 may, for example, have a funnel-shaped configuration similar to that shown in the aforesaid patent of Giffen et al.

Ring mold 11 comprises a first outside annular portion 13 having a smooth bottom surface 14 which rests on and closely fits against a smooth top surface 16, defining the circular top opening of the annular top of funnel mold 12, to provide a close seal between such parts effective against the flow of glass therebetween. A plurality of at least three recesses or keyways, such as 17, are provided in the bottom of the outer periphery of portion 13 of ring mold 11. Cooperating lugs, such as 18 (FIG. 2) on the outer periphery of the top of funnel mold 12 extend into and closely fit each said keyway to key the ring mold 11 to the funnel mold and prevent lateral and rotational relative movement therebetween.

The bottom surface of a second annular portion 19 of ring mold 11 is recessed to provide an inverted annular channel 21 extending around the bottom of the ring mold and having a width corresponding to the desired width for the seal edge or sealing surface of a glass funnel member centrifugally formed in the main funnel mold 12 and ring mold 11.

Ring mold 11 further includes a main annular portion 22 immediately within annular portion 19 of the ring mold. The bottom of said portion 22 of ring mold 11 extends substantially below the remainder of the ring mold and provides a pendant annulus 23 (FIG. 2) whose outside surface 24, moving in the downward direction from the innermost border of channel 21, curves inwardly towards the center of the ring mold. This will be readily apparent from a brief glance at FIG. 2 of the drawings. The annular space between said surface 24 of annulus 23 and the inner mold wall 26 of the main mold 12, and extending into channel 21, provides a catch basin for molten glass, such as 27, moved by centrifugal force up along inner mold wall 26 of mold 12 as described below.

In employing the funnel mold 12 and cooperating neck ring mold 11 illustrated in FIGS. 1 and 2 of the drawings, a measured charge of molten glass is supplied to mold 12 which is then rotated to cause the glass to be moved by centrifugal force up the inner mold wall 26 of such mold. Such centrifugal forming or spinning processes are very well known and reference is again made to said Giffen et al. patent for a more complete description of such a process, if such is desired. The similarity between the funnel mold 12 and neck ring mold 11, and the corresponding parts shown in the aforecited British patent will be readily apparent from a brief glance at such patent.

As illustrated in FIG. 2, the molten glass 27 flows up the inner mold wall 26 of mold 12 and into the aforementioned catch basin including channel 21 of ring mold 11, such channel forming the upper end of the catch basin, as previously mentioned. The molten glass fills channel 21 and, depending on the volume of the measured charge of glass supplied to mold 12, part of the remainder of such catch basin. The volume of the measured charge of molten glass is, of course, maintained within limits of an allowable range so that the glass will completely fill channel 21 but will not excessively fill the remainder of said catch basin. Thereafter, the rotation of mold 12 is continued until the molten glass 27 is sufficiently cooled to maintain the form imparted thereto by molds 11 and 12, thereby producing funnel member 28.

It will be apparent to those skilled in the glass-forming art that there is the possibility of crizzle developing on the seal edge or sealing surface 29 of funnel member 28 if the molten glass 27 is cooled at too rapid a rate. However, molds 11 and 12 being round or radially symmetrical, at least in the region of said seal edge, the parameters of the forming and cooling process, such as the temperature of the molten glass, the temperatures and cooling effects of molds 11 and 12 etc. can be adjusted within certain required limits to provide as rapid a rate of cooling as possible of a funnel part, such as 28, while still preventing the development of said crizzle. That is to say, since a funnel part such as 28 is radially symmetrical, the thickness of the glass around any horizontal cross section of the funnel is substantially uniform and, therefore, if a cooling differential between any regions of such a cross section occurs for some reason, it can be readily controlled. This will be readily apparent to those skilled in the art.

Referring now to FIGS. 3 through 7 of the drawings, a novel type of ring mold for forming a wide seal edge bisymmetrical funnel member for a rectangular television picture tube envelope will be described, such ring mold embodying the present invention.

It is desired to point out at this point in the description that, although the novel type of ring mold herein disclosed is illustrated and described as a two-part ring mold comprising upper and lower parts, such illustration and description is merely for the purpose of disclosing the best method contemplated for manufacturing a ring mold embodying the invention, that is, for carrying out the invention. As will become apparent as the description proceeds, the ring mold herein disclosed is, in actuality, a composite or one-piece ring mold since the two parts of the ring mold are securely fastened to each other to form a one-piece mold.

There is illustrated in FIG. 3, approximately a quarter arcuate section of the top part 30a of a ring mold 31 to be used in conjunction with a television funnel member mold 32 (FIGS. 5, 6 and 7) having a top bisymmetrical open end leading to the mold cavity which otherwise generally conforms to a shape to be imparted to a funnel member for a so-called rectangular television picture tube envelope. Such a funnel mold may, for example, have a general configuration similar to the mold illustrated in Letters Patent of the United States 2,662,347 issued Dec. 15, 1953 to James W. Giffen for Glass Forming Mold.

Ring mold part 30a comprises a first outside annular portion 33 having a smooth bottom surface 34 (FIGS. 6 and 7) which rests on and closely fits against a portion of a smooth top surface 36 defining the substantially rectangu- of the outer periphery of portion 33 of ring mold 32. A plurality of at least three recesses or keyways, such as 37 (FIGS. 3, 5 and 6) are provided in the bottom of the outer periphery of portion 33 of ring mold part 30a. Cooperating lugs, such as 38 (FIGS. 5 and 6) on the outer periphery of the top of funnel mold 32 extend into and closely fit each said keyway to key ring mold part 30a to mold 32 and prevent lateral and rotational relative movement therebetween.

The bottom surface of a second annular portion 39 of ring mold part 30a is recessed to provide a wide and relatively deep inverted annular channel 40 extending about the bottom of such mold part and having its inner border defined by a depending third annular portion 39a of ring mold part 30a. There is also provided in the bottom surface of said annular portion 39, that is, in the surface defining the top border of channel 40, a plurality of at least three keyways, such as 40a (FIGS. 3, 5 and 6) which are used for a purpose hereinafter discussed. Ring mold part 30a is also provided with a plurality of holes such as 45 (FIG. 3) extending vertically through such mold part and spaced apart about the top periphery thereof. The purpose of such holes will also be discussed hereinafter in the description.

Referring in detail to FIG. 4 in conjunction with FIGS. 5, 6 and 7, there is illustrated a quarter arcuate section of the lower part 30b of the ring mold 31, such mold part comprising a first outside annular portion 33a having a smooth bottom surface 34a which rests on and closely fits against said top surface 36 of main funnel mold 32 to provide a seal between such parts to effectively prevent the flow of molten glass therebetween. A second annular portion 33b of ring mold part 30b and immediately within portion 33a of such mold part is recessed to provide an inverted annular channel 41 extending around the bottom of such mold part and having a width corresponding to the desired width for the seal edge or sealing surface of a glass funnel member centrifugally formed in the main funnel mold 32 and ring mold 31.

Ring mold part 30b further includes a main annular portion 42 immediately within annular portion 33b of such mold part. The bottom of said portion 42 of ring mold part 30b extends substantially below the remainder of such mold part and provides a pendant annulus 43 whose outside surface 44, moving in the downward direction from the innermost border of channel 41, curves inwardly towards the center of the ring mold part. This will be apparent from a brief glance at FIGS. 5, 6 and 7 of the drawings. The annular space between said surface 44 of annulus 43 and the inner mold wall 46 of funnel mold 32, and extending into channel 41, provides a catch basin for molten glass, such as 47, moved by centrifugal force up along inner mold wall 46 of mold 32 as hereinafter described. As illustrated in FIGS. 4 and 7 of the drawings, annulus 43 in the corner regions of ring mold part 30b, extends further downwardly and inwardly into the mold cavity of funnel mold 32 than it does in the remaining regions of the ring mold part. Thus the catch basin in the corner regions of the ring mold part is substantially wider and deeper than in the other regions thereof and is provided because of the substantially greater volume of molten glass which flows into said corner regions during centrifugal forming.

As illustrated in FIGS. 5, 6 and 7, the top of the annular portions 33a, 33b and 42 of ring mold part 30b cooperatively mate with the bottom of the annular portions 39 and 39a of ring mold part 30a. In addition the top surface of portion 42 of ring mold part 30b is provided with a plurality of lugs, such as 40b (FIGS. 4, 5 and 6) equal in number and corresponding to the keyways, such as 40a, in ring mold part 30a, one such lug extending into and closely fitting each said keyway to key the ring mold parts to each other. Ring mold part 30b is also provided with a plurality of holes, such as 45a (FIG. 4) corresponding to the holes, such as 45, in ring mold part 30a. When the ring mold parts 30a and 30b are disposed in relationship with each other as illustrated in FIGS. 5, 6 and 7, such parts are securely fastened to each other by screws inserted through the holes, such as 45, in the upper mold part and screwed into cooperating threads provided in the holes, such as 45a, in the lower mold part.

As shown in FIGS. 3 and 6 of the drawings, a selected region of the lower surface of portion 39 of the upper mold ring part 30a is recessed to provide an inverted relatively wide and shallow channel or air chamber 49 which extends along the length of the mold ring part 30a which lies above one of the lengths of the sidewall of funnel mold 32 that is generally parallel with the major axis of the opening into the mold cavity of such mold. As will be readily apparent, a channel or air chamber similar to 49 is also provided along the length of the mold ring part 30a which lies above the second length of sidewall of funnel mold 32 that extends generally parallel with said major axis. However, for purposes of simplification of the drawings, only channel 49 is illustrated therein. The channels or air chambers, such as 49, supply, in the regions where such channels are provided, a predetermined degree of thermal insulation between the upper part 30a and the lower part 30b of the ring mold. It is pointed out that the channels, such as 49, could as well be provided in the lower part 30b of the ring mold rather than in the upper part 30a, or such channels could be provided in corresponding regions of both parts. While channel 49 is illustrated in the drawings as providing an air chamber or a dead-air space to attain said thermal insulation, it is pointed out that such space could, if found desirable or expedient, be filled with a noncombustible or heat resistant thermally insulating material, such as asbestos for example. It will be noted that FIGS. 5 and 6 of the drawings illustrate the two-piece ring mold as having a cross-sectional configuration similar to that of the one piece ring mold illustrated in FIG. 2 of the drawings, with the exception of the aforesaid thermal insulating channels, such as 49, provided in the two-piece ring mold. Also, as illustrated in FIG. 7, a cross-section of the corner regions of the two-piece ring mold differs somewhat, as previously described, from the cross-section of the circular ring mold illustrated in FIG. 2.

In employing the ring mold of FIGS. 3 through 7 of the drawings, the ring mold is disposed upon and keyed to the top of the main funnel mold 32 as shown in FIGS. 5, 6 and 7. A measured charge of molten glass is then supplied to the main funnel mold for centrifugal forming of the glass into a funnel member for a rectangular television picture tube envelope. The funnel and ring molds are then spun, as previously discussed in conjunction with the circular molds of FIGS. 1 and 2, and the molten glass 47 is thereby caused to move upwardly along the sidewalls of the funnel mold and into channel 41 to form a seal edge or sealing surface on a funnel member, such as 48, thus formed in the molds. However, as previously mentioned, due to the rectangular configuration of the top open end of funnel mold 32, the molten glass 47, during the spinning or centrifugal forming operation, moves horizontally along the relatively straight sidewalls of the funnel mold and, as illustrated in FIG. 7, collects in the corner regions of the mold to form on the funnel member, such as 48, a wall having a substantially greater thickness in the corner regions thereof than such wall has at the ends of the minor axis of the funnel member. This is readily seen by comparison of the thicknesses of the wall of the funnel member 48 as illustrated in FIGS. 6 and 7 of the drawings. By comparison of the thicknesses of the wall of the funnel member 48 as illustrated in FIGS. 5 and 6 of the drawings, it will also be noted that such wall has a somewhat greater thickness at the ends of the major axis of the member (FIG. 5) than at the ends of the minor axis thereof (FIG. 6). That is, the thickness of said wall at the ends of the major axis is intermediate the thicknesses of such wall at the ends of the diagonal and minor axes of the funnel member.

In order to reduce the rate of cooling of the molten glass, that is, the rate of heat removal from the molten glass in the regions of the ends of said minor axis as compared to such rate in the regions of the ends of said major and diagonal axes, and thereby prevent the development of the aforementioned crizzle on the sealing surface or seal edge of the funnel member adjacent the ends of the minor axis, the previously discussed thermally insulating air chambers or channels, such as 49, are provided. Such channels reduce the rate of heat transfer through the metal of which the two-piece ring mold is made. The additional metal provided in the corner regions of portion 43 of the ring mold part 30b, in addition to enlarging the catch basin for the molten glass in such regions as previously mentioned, somewhat increases the rate of heat removal or cooling of the larger mass of glass collecting in such regions. Although said increase in the rate of heat removal in said corner regions is not critical to the prevention of crizzle, such increase in rate of heat removal does somewhat decrease the time required for the molten glass to become firmly "set-up" in the molds. Thus the rate of heat removal from the molten glass around the perimeter of a funnel member, such as 48, formed in the funnel and ring molds from such glass, is substantially uniformly controlled to allow for variations in the thickness of the glass which forms such funnel member. The variables of the glass forming process itself, such as the temperature range for the proper forming of a funnel member from a molten glass of a selected composition without the formation of the aforementioned crizzle, can be readily determined by a minimum amount of experimentation since substantially uniform cooling of the sealing surface or seal edge of the funnel member and the adjacent regions of the wall thereof, regardless of regions of varying wall thickness of the funnel member, is provided for by the type of ring mold herein disclosed.

What is claimed is:

1. In combination with a hollow mold having a generally funnel shaped open-ended mold cavity for centrifugally forming television picture tube funnel members having a generally rectangular frusto-pyramidical configuration, means for forming a wide sealing surface on each of said funnel members for sealing thereof to the complementally mating sealing surface of a viewing panel to fabricate a complete picture tube envelope, such means comprising, a ring mold complementally mating with and keyed against lateral and rotational movement to the top of said hollow mold adjacent the entrance to said mold cavity, the bottom surface of said ring mold being recessed to provide an inverted annular channel for receipt of molten glass flowing up the inner wall of said hollow mold during the centrifugal forming of a funnel member therein, such channel having a width corresponding to the desired width of said sealing surface on each of said funnel members and all areas of the surface defining the upper border of said channel extending substantially in the same horizontal plane, a thermal insulation between upper and lower parts of said ring mold and overlying said channel in regions thereof extending generally parallel with the major axis of the open end of said mold cavity but short of the corners of such cavity, whereby the rate of removal of heat by the ring mold from said molten glass flowing into said channel to form said sealing surface is reduced in said regions to prevent the development of crizzle on said sealing surface.

2. A ring mold in accordance with claim 1 and in which said thermal insulation comprises air in air chambers provided between said upper and lower ring mold parts.

3. A ring mold in accordance with claim 1 in which said thermal insulation comprises a noncombustible material.

4. A ring mold for use in conjunction with a hollow mold for centrifugally forming from molten glass a funnel member for a television picture tube envelope having a generally rectangular frusto-pyramidical configuration and a wide sealing surface for sealing thereof to the complementally mating sealing surface of a viewing panel member to fabricate a complete tube envelope, such ring mold contoured to fit the open end of said hollow mold so as to prevent lateral and rotational relative movement therebetween when the ring mold is disposed upon said open end for the centrifugal forming of said funnel member, the ring mold comprising upper and lower annular parts whose lower and upper surfaces respectively are disposed in face-to-face relationship with each other, said surfaces being at least partially thermally insulated from each other in regions extending along the longer of the generally straight portions of said surfaces but short of the corners of such surfaces, and the lower surface of said lower part having a recess forming an annular inverted channel for receipt of molten glass flowing up the sidewall of said hollow mold during the centrifugal forming of said funnel member, such channel having a width corresponding to the desired width of said sealing surface for such funnel member.

5. A ring mold in accordance with claim 4 in which said regions of said face-to-face surfaces are thermally insulated from each other by air chambers provided between such surfaces.

6. A ring mold in accordance with claim 5 in which said air chambers comprise dead-air spaces established by recesses provided in at least one of said face-to-face surfaces.

References Cited

UNITED STATES PATENTS 3,003,287   10/1961   Torok _____ 65—319

FOREIGN PATENTS 424,525   3/1911   France.

S. LEON BASHORE, Primary Examiner

A. D. KELLOGG, Assistant Examiner

U.S. Cl. X.R.

18—26; 65—71, 319, 351, 356